United States Patent [19]

Isenberg

[11] Patent Number: 4,728,584
[45] Date of Patent: Mar. 1, 1988

[54] FUEL CELL GENERATOR CONTAINING SELF-SUPPORTING HIGH GAS FLOW SOLID OXIDE ELECTROLYTE FUEL CELLS

[75] Inventor: Arnold O. Isenberg, Pittsburgh, Pa.

[73] Assignee: Westinghouse Electric Corp., Pittsburgh, Pa.

[21] Appl. No.: 921,296

[22] Filed: Oct. 21, 1986

[51] Int. Cl.$^4$ .............................................. H01M 8/12
[52] U.S. Cl. .......................................... 429/31; 429/33; 429/34; 429/40; 204/260; 204/265; 204/266
[58] Field of Search ........................ 429/30, 31, 32, 33, 429/38, 40, 34; 204/260, 265, 266

[56] References Cited

U.S. PATENT DOCUMENTS

| | | | |
|---|---|---|---|
| 3,259,524 | 7/1966 | Fay et al. | 429/38 |
| 3,402,230 | 9/1968 | White | 429/31 X |
| 3,460,991 | 8/1969 | White | 429/31 |
| 3,525,646 | 8/1970 | Tannenberger et al. | 429/31 |
| 3,526,549 | 9/1970 | Archer et al. | 429/32 |
| 3,668,010 | 6/1972 | Fally et al. | 429/31 |
| 4,174,260 | 11/1979 | Schmidberger | 204/260 |
| 4,395,468 | 7/1983 | Isenberg | 429/31 |
| 4,476,198 | 10/1984 | Ackerman | 429/32 |
| 4,490,444 | 12/1984 | Isenberg | 429/31 |
| 4,640,875 | 2/1987 | Makiel | 429/30 |

*Primary Examiner*—Anthony Skapars
*Attorney, Agent, or Firm*—Daniel P. Cillo

[57] ABSTRACT

An axially elongated, electrochemical cell assembly is made, containing a plurality of cell elements each made up of an electronically conductive, porous, inner electrode, an annular, solid electrolyte contacting and surrounding said first electrode, and an annular, electronically conductive, porous, outer electrode contacting and surrounding said electrolyte, with annular, electronically conductive, interconnection members disposed between and bonded to cell elements, where the inner electrodes of the cell elements are electronically connected through the interconnection member, and the outer electrodes of the cell elements are physically and electronically segmented from each other; where a plurality of such cell assemblies can be connected by a sleeving means and placed in the generating chamber of an electrochemical cell generator, which also has an associated dual gaseous reactant input, at least one combustion product chamber, and a combustion product gas exhaust.

37 Claims, 12 Drawing Figures

FUEL CELL GENERATOR CONTAINING SELF-SUPPORTING HIGH GAS FLOW SOLID OXIDE ELECTROLYTE FUEL CELLS

BACKGROUND OF THE INVENTION

1. Field of the Invention

The present invention relates to a high temperature, solid electrolyte, elongated, electrochemical cell containing a plurality of annular, self-supporting cell segments or elements contacting annular interconnection members disposed between the cell elements; and to a plurality of such cells electronically interconnected in a generator chamber in an electrochemical generator apparatus.

2. Description of the Prior Art

Fuel cells having a concentric configuration of tubular electrodes, supported and spaced away from each other, are well known in the art, and taught, for example, by Fay et al., in U.S. Pat. No. 3,259,524. There, a noble metal impregnated, closed-tube, outer graphite electrode was supported in a spaced relationship in a housing, by inert plugs, and contained a spaced apart, closed-tube, inner palladium electrode into the bottom of which a fuel was fed by means of a long fuel tube. The electrolyte used was an aqueous solution of potassium hydroxide, and the apparatus operated at a low temperature. It was later found, that solid electrolyte fuel cells, operating at a high temperature, provided a much more efficient electrochemical apparatus. Electrical connections between adjacent cells posed interesting problems in these solid oxide type apparatus.

White, in U.S. Pat. Nos. 3,402,230, and 3,460,991, taught a self-supporting, one piece, tubular, high temperature, solid electrolyte fuel cell tube. There, an elongated, tubular, gas tight cell stack was taught, with solid electrolyte generally disposed between air electrodes and fuel electrodes. The cell tube was unitarily formed as a continuous tube, rather than assembled as a series of individual cells. Gaps between the cells were filled with an overlap of top air electrode overrunning the underlying solid electrolyte to physically and electrically contact the bottom electrode forming an electrode-to-electrode connection on the tubular structure. Calcia stabilized electrolyte was taught, along with a variety of cathode and anode materials. Electronic connections between individual fuel cell stack tubes were made in series, directly from the inner electrode of one cell stack tube to the outer electrode of a parallel, adjacent cell stack tube.

Tannenberger et al., in U.S. Pat. No. 3,525,646, also taught a tubular, solid oxide, fuel cell stack structure, similar to that taught by White, but, supported on a porous tube, and having segmentation between top electrode layers and between bottom electrode layers, but electronic connection between bottom and top electrodes along its length. Archer et al., U.S. Pat. No. 3,526,549 also dealt with flat, solid electrolyte in cylindrical cell configuration, utilizing a fuel and an oxidant. There, fuel and air electrodes were coated on opposite faces of a solid electrolyte disc, between contacting annular gaskets and space apart annular current collectors which defined air and fuel compartments. Both air and fuel were fed through manifolds internal to the cells, where air and fuel flow across electrodes was 90 to the axial length of the cylindrical configuration.

Fally et al., in U.S. Pat. No. 3,668,010, taught solid electrolyte cell stacks in tubular form, having electrodes on their inner and outer surfaces, where a round metal plug was used to fill holes made through the electrolyte tube, so as to electronically connect the outer electrode of one cell with the inner electrode of an adjacent cell in series, similarly to White, at a number of places around the circumference of the tube. Schmidberger, in U.S. Pat. No. 4,174,260, taught internal, tubular interconnection rings, for series-connected cell stacks, where the inner electrode of a tubular, solid oxide, fuel cell arrangement overlapped an inner portion of the interconnection ring, and the outer electrode overlapped an outer portion of the interconnection ring, so as to electronically connect inner and outer electrodes, again, similarly to White.

More to date, Isenberg, in U.S. Pat. No. 4,395,468, taught a fuel cell arrangement incorporating long, thin, continuous, tubular, solid oxide fuel cells, where air was fed into the center of the single cell tube, which contained an air electrode on a support tube, by means of air feed tubes, which could be inserted into the porous support tube for air distribution. Fuel flowed between and around the outer fuel electrodes of parallel sets of single fuel cells. A single air inlet, fuel inlet, and reaction product combustion outlet were taught. Isenberg, in U.S. Pat. No. 4,490,444, taught solid oxide fuel cell configurations and interconnections. The fuel cell design was a continuous design used by Isenberg in U.S. Pat. No. 4,395,468, and was constructed with a long, separate, central, porous support tube covered by an air electrode, solid electrolyte and fuel electrode. Each fuel cell had a long, single interconnection, and an attached metal felt strip, extending the length of the fuel cell, for the air electrode of one cell to electronically connect to the fuel electrode of adjacent cell. Cells could also be connected in parallel by means of additional, attached metal felt strips.

An alternate design taught by Isenberg in U.S. Pat. No. 4,490,444, involved circumferential segmentation of the elongated single cells. By dividing the long cell into segments, each segment would be contacted with similarly depleted air and fuel, rather than one end of a long cell seeing fresh air and fresh fuel and the other end seeing depleted air and depleted fuel. The circumferential portion between segments was taught as being an electronically insulating solid electrolyte material, such as yttria stabilized zirconia. In all cases, the air electrode could be made of doped or undoped oxides or mixtures of oxides in the pervoskite family, such as $LaMnO_3$, and the fuel electrode could be made of a nickel zirconia cermet material. Grimble et al. further advanced the Isenberg design with U.S. Ser. No. 852,865, filed on Apr. 16, 1986, and assigned to this invention, by in-situ reforming of fuel along the entire length of the fuel cell, and by adding separate fuel feed tubes exterior to and disposed between the fuel cells to provide unreformed fuel feed.

Ackerman et al., in U.S. Pat. No. 4,476,198, departed from spaced apart tubular cells, teaching solid oxide fuel cells arranged in a close packed, contacting array in a generator. Here, a corrugated plate structure of fuel electrode, air electrode and electrolyte formed opposing triangular channels in contact with an electrical interconnection material layer disposed between those corrugated layers and connecting positive and negative electrodes of different layers. All the layers were in bonded series-connected electronic contact through the interconnection. Oxidant was fed into a triangular air electrode space by means of air feed tubes extending the length of the air electrode space. Single oxidant inlet, fuel inlet, generator, and reaction product combustion outlet chambers were taught. The fuel and air electrodes and electrolyte disposed between them were of a long, continuous design.

The fuel cell and generator of U.S. Pat. Nos. 4,395,468 and 4,490,444, the most current of the tubular designs, relate to long cells, usually of about 15 mm outside diameter, where the diameter of the cell cannot be increased, however, not without also raising the cell resistance. These fuel cells have associated power losses due to the resistance of the oxide air electrodes mainly and due to the fact that the electrical current in the air electrode flows in a circumferential pattern to an axially positioned interconnection strip, and from there to a metallic current collector felt. These cells also require time consuming and expensive masking-demasking steps in the deposition processes used and add substantially to cell cost, which cost becomes very significant because of the large number of cells required in each generator. Also, cell designs of White, Tannenberger et al., Schmidberger, and similar series-connected stack type processes, require labor intensive masking-demasking steps and electrical interconnection steps adding substantially to design complication and cell cost.

Present cells of this tubular configuration can achieve moderate power levels, about 20 watts per 30 cm long fuel cell tube. Power can be increased by extending the length of the active cell, however, cell lengths over about 1.2 meters (4 feet) present fabrication problems. Also, long and small bore cell tubes present a problem in air manifolding in generators, due to increased pressure drop. While the present design is reliable and quite adequate for small and medium size generators, a new design of both generator and fuel cell is needed, which would provide major cost reductions in cell fabrication, while at the same time providing higher generator power levels.

OBJECT OF THE INVENTION

It is an object of this invention to provide a unique cell configuration of increased diameter, allowing the cells to be self-supporting and easily and inexpensively fabricated, where the configuration provides a shorter current flow path in the air electrode, and also to provide a more efficient and power capable interconnection, support, and generator design.

SUMMARY OF THE INVENTION

The above needs and objects have been met by the present invention, which in its broadest aspect provides an axially elongated, annular, low voltage electrochemical cell comprising a plurality of annular, cell segments or elements. The term "annular" as used herein can include a variety of closed cross-sections, such as a round or square cross-section. Such cells in an assembly are usually divided into several cell subassemblies connected by a sleeving means. Each cell segment or element has an inner and outer annular electrode with an electronically insulating, solid electrolyte layer therebetween. The inner electrode of each cell element is bonded to an annular, electronically conductive, interconnection ring member disposed between cell elements, while the outer electrodes of the plurality of cell elements are physically and electronically segmented from each other and from the inner electrodes. The electrodes are electronically conductive, i.e., allow free flow of electrons. The electrolyte is ionically conductive and electronically insulating, i.e., electrons are attached to a mass which transfers through the electrolyte. The oxygen ion contains the mass plus electrons.

Thus, there is a continuous electronic conduction through the entire tubular length of the inner electrode portion of the subassemblies and a short flow path current in the inner air electrode to the interconnection member. A hollow air flow chamber is defined by the air electrode elements or segments and the interconnection member. In all instances, each successive layer surrounds the bottom layer it contacts.

Preferably the interconnection member has a recess, notched or grooved in its side, to receive the annular inner electrode edge. Also, simple, square butting joints can be used at the inner electrode-interconnection member interface, which is in all cases sinter bonded together or glued with conductive cement. The solid electrolyte layer preferably covers an outer portion of the interconnection member, insuring a gas tight seal between the gas tight interconnection member and the inner electrode. The bonded cell elements are self-supporting and long, while the interconnection members are short but of similar diameter, which diameter is not limited in dimension. The axially elongated, cell assemblies are positioned parallel to and adjacent one another and electronically connected in series by conductive assembly connectors. In series, each assembly connector contacts the interconnection member of one cell assembly, and the outer electrode of one adjacent cell assembly. In a somewhat similar fashion, parallel electrical connections can be made, where interconnections are contacted to interconnections and outer electrodes are contacted to outer electrodes along rows.

The power output of each cell element can be as high as 10 watts, and since a 2 meter (6.5 feet) cell assembly length is possible using the configuration of this invention, and a variety of connecting, sleeving members, the long cell assembly can be composed of four, 50 cm long cell subassemblies, each subassembly containing about 5 cell elements, totaling about 40 cell elements and representing a possible 400 total watts per elongated, cell assembly. This cell configuration can of course also be used for short length cell assemblies. For an equal number of tubular structures, this could provide up to 20 times more power than former Isenberg tubular fuel cell designs described in U.S. Pat. Nos. 4,395,468 and 4,490,444. Each cell element can be about 40 mm long and have about a 45 mm outside diameter, with a wall thickness of about 3 mm. This relatively large cross section and wall thickness eliminates the need for a separate support member, and provides a large internal cross-sectional area for gas flow. The cell element diameter is governed by resistance losses in metal connectors from cell assembly to cell assembly. Smaller cell element diameters can be of advantage in reducing electrical losses in such.

For optimum operation of these large internal area cell elements, a higher flow of fuel and air is required than for former tubular fuel cell designs. While the unique, electrochemical cell assemblies of this invention can be used in a well known conventional generator shell, containing single generating and preheating chambers, to optimize the invention a higher gas flow design is preferred. In the high gas flow generator apparatus design of this invention, the elongated cell assemblies will be open at both ends, each end being in communication with a separate combustion product chamber having its own exhaust gas exit port.

The new, preferred, generator design of this invention thus comprises: a housing means defining a plurality of chambers including two combustion product chambers, with a generator chamber disposed between them; porous barriers separating the generator chamber and the two combustion product chambers; a plurality of elongated, annular, electrochemical cell assemblies comprising a plurality of cell elements disposed in the generator chamber; means for flowing a first gaseous reactant into the elongated, annular, electrochemical cell assemblies, to contact an inner electrode, and through the porous barriers into the combustion product chambers; means for flowing a second gaseous reactant into the generating chamber, about the elongated, annular, electrochemical cell assemblies, to contact an outer electrode, and through the porous barriers into the combustion product chambers; means for segregating the first and second reactants from direct contact with one another prior to entry of each into the combustion product chambers; and means to exhaust the first and second reactants from the combustion product chambers.

Preferably, the means to flow gaseous reactants is a gas injector tube, the electrochemical cell assemblies are fuel cell assemblies, with the outer electrode being a fuel electrode and the inner electrode being an air electrode. Preferably, the cell elements and interconnection members are circular, although other cross-sections are possible, for example, a corrugated cross-section would allow an increase of the active surface area of the cell elements. Preferably, the subassemblies are connected by means of a sleeve member which also provides internal support for gas injector tubes centrally located within the elongated, fuel cell assembly.

The elongated, electrochemical cell assembly, described in this invention which constitutes essentially a large, segmented, single cell, can dramatically increase power levels over present single, continuous, long cell configurations, can allow elimination of the inner porous support structure for the cell elements, can help solve pressure drop problems in gas manifolding inherent in small bore long tube design, can substantially eliminate expensive fabrication costs of small bore long tubes, can allow much better thermal expansion matching of cell assembly components because sintered bodies of better matching compositions can be used, and can help eliminate laborious vapor deposition and masking-demasking processing steps in vapor deposition of the thin layer electrolyte, for instance, presently used for solid oxide fuel cells. This design can also be utilized as an electrolysis cell for steam and carbon dioxide.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
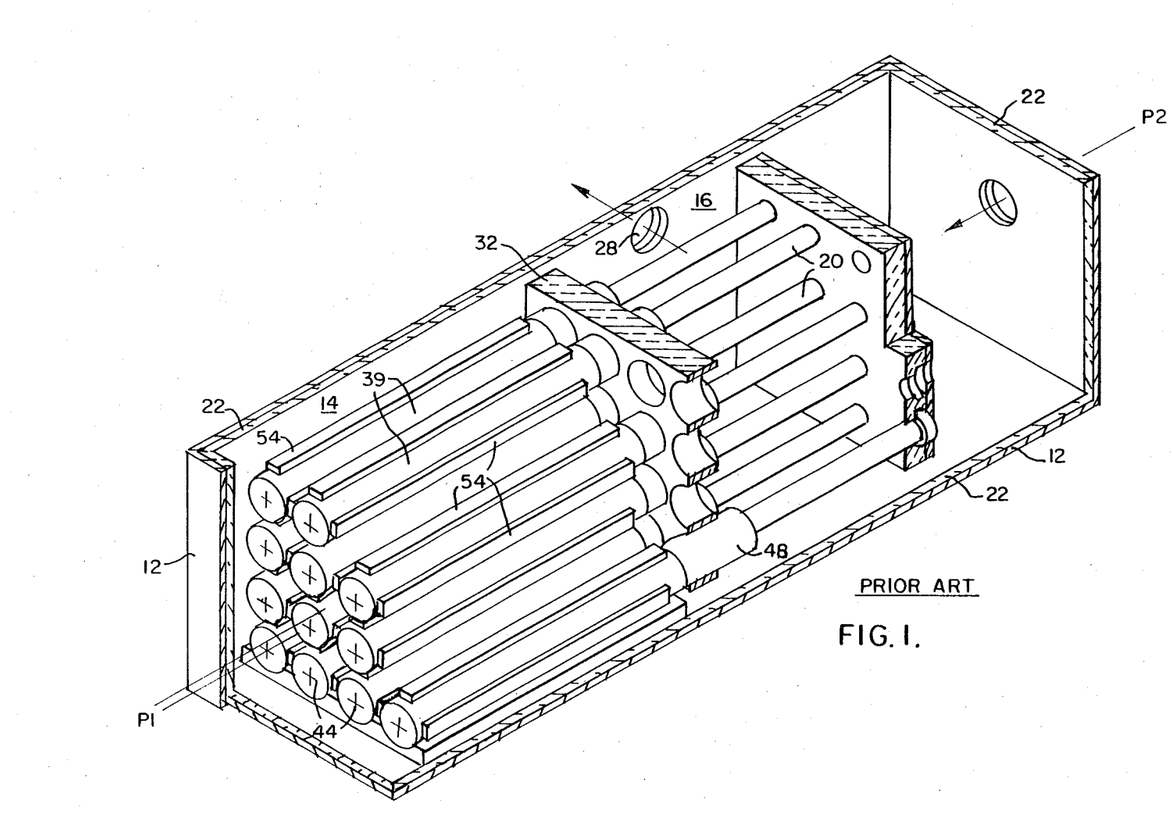
FIG. 1 is a broken perspective view of the long, tubular, prior art electrochemical cell design using metal felt interconnections, in a prior art electrochemical generator shell having a single generator chamber, and a single combustion product chamber.

Referring now to FIG. 1 of the Drawings, a prior art fuel cell and fuel cell generator design, such as that described in U.S. Pat. No. 4,395,468, is shown. The generator contains a gas tight housing 12, with associated insulation 22, a single generating chamber 14, and a single preheating chamber 16 with exhaust port 28. Fuel, PI, flows into one side of the generator, and oxidant, P2, flows into the other side. The fuel flows about the long, tubular, one piece fuel cells 39 and through porous barrier layer 32 into the combustion product chamber, as depleted fuel. Oxidant enters the fuel cells 39 by means of oxidant injector feed tubes 20, which have an open end within the fuel cells 39 whereby fresh oxidant reaches the inside end of the fuel cells, reverses direction, and as depleted oxidant exits through inactive portion 48 into the preheating chamber 16. The depleted oxidant contacts depleted fuel in the preheating chamber, both of which combust to heat the oxidant flowing within feed tubes 20, and then exit through port 28. The fuel cells 39 are all interconnected by means of long, external, metal fiber felts 54, extending along the entire active length of the fuel cells. The ends 44 of the fuel cells 39 are closed.

Figure 2:
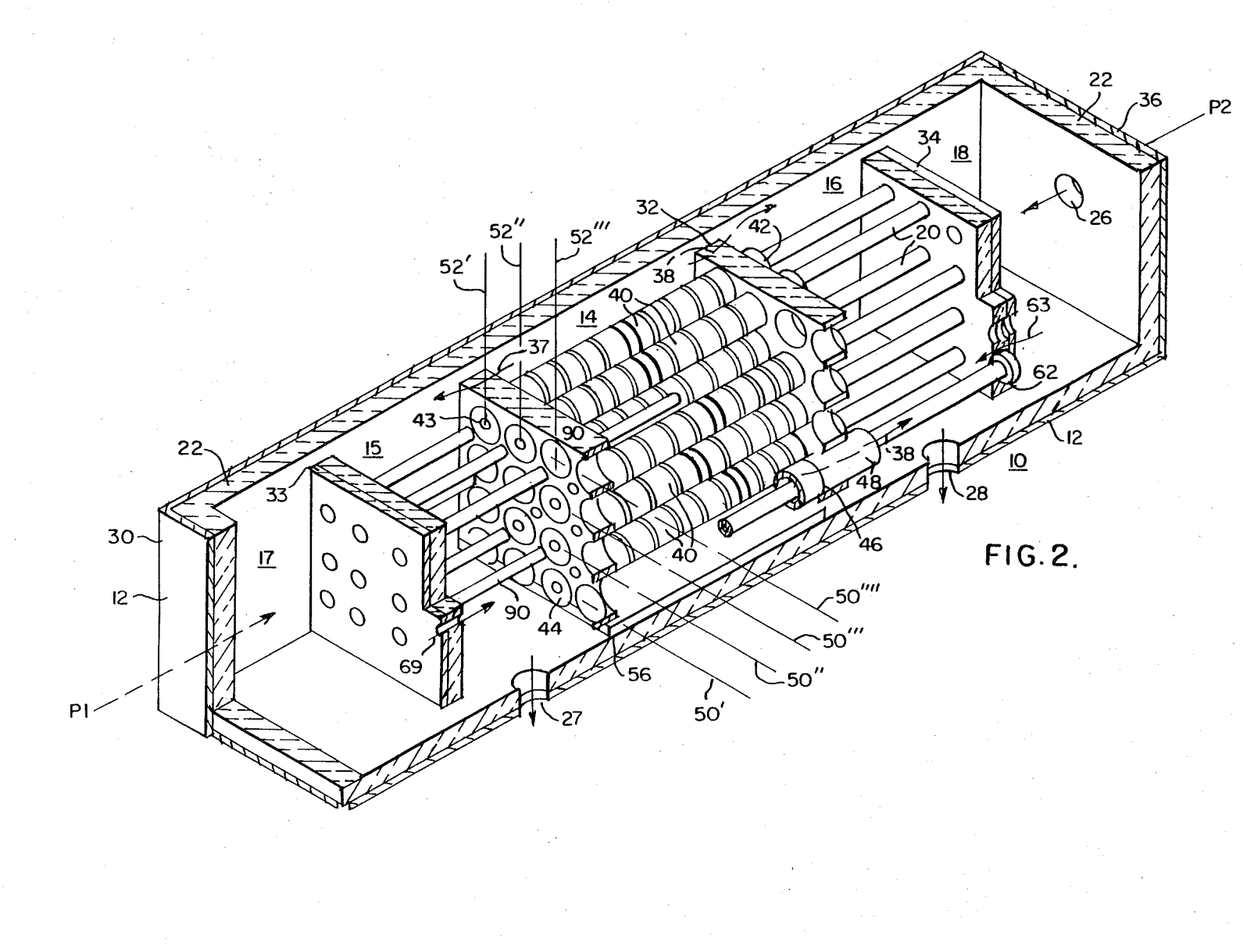
FIG. 2 is a broken perspective view of one embodiment of a preferred, electrochemical generator in accordance with this invention, including a plurality of elongated, electrochemical cell assemblies and dual combustion product chambers.

Referring to FIG. 2 of the Drawings, there is shown on embodiment of the preferred, high power, high gas flow, electrochemical cell generator design of this invention. The generator 10 includes a gas tight housing means 12, defining and surrounding a plurality of chambers, including a central generating chamber 14 disposed between dual combustion product or preheating chambers 15 and 16. A fuel inlet chamber or appropriate manifolding means 17 and an oxidant inlet chamber or appropriate manifolding means 18 can also be contained within housing 12, each disposed next to a preheating chamber. Porous barriers 31 and 32 separate the central generating chamber 14 and the two combustion product or preheating chambers 15 and 16. A plurality of axially elongated, electrochemical cell assemblies 40, each comprising a plurality of cell elements, are disposed within the central generating chamber 14.

The generator 10 also has means for flowing a first gaseous reactant, fuel PI, about the cell assemblies 40, to contact an outer electrode, and through the porous barriers 31 and 32 into combustion product chambers 15 and 16; and means for flowing a second gaseous reactant, oxidant P2, into the cell assemblies 40, to contact an inner electrode, and through the porous barriers 32 and 31 into combustion product chambers 16 and 15. The first and second reactants are segregated from direct contact with one another prior to entry of each into the combustion product chambers.

The housing 12 is preferably comprised of steel or other suitable metal alloy, and lined throughout with a thermal insulation, one layer of which is shown as 22, such as low density alumina insulation. Penetrating the housing 12 and insulation 22 is a fuel inlet port 24, shown best in FIG. 3 of the Drawings, an air inlet port 26, and combustion product outlet ports 27 and 28, as well as ports for insulated electrical leads 58, also shown best in FIG. 3. The generating chamber 14 extends between the porous barriers 31 and 32. The preheating chambers 15 and 16 extend between the porous barriers 31 and 32 and a respective tube support structure of some sort, such as metal tube sheets 33 and 34. The oxidant inlet chamber 18 can extend between the tube sheet 34 and end wall 36 of the housing 12. The fuel inlet chamber 17 can extend between the tube sheet 33 and end wall 30 of the housing 12. The dividing barriers can include other structural types, and additional support and flow baffles can be incorporated.

The shown barriers, i.e., the porous barriers 31 and 32 and the tube sheets 33 and 34, need not be sealed structures. The porous barriers 31 and 32, are designed to allow gas flow between the generating chamber 14, operating at an approximate pressure slightly above atmospheric, and the preheating chambers 15 and 16, operating at a slightly lower pressure, as indicated by arrows 37 and 38. However, barrier 32 may be made tighter in this invention so that all the fuel introduced into generating chamber 14 does not flow into preheating chamber 16, but due to some means of restriction, such as use of a higher density material for barrier 32, approximately ½ of the entering fuel will exit to preheating chamber 15.

While the generator 10 is shown in a horizontal orientation in FIG. 2, it can be operated in a vertical or other position. High temperature operative, elongated, solid electrolyte containing, electrochemical cell assemblies 40, preferably fuel cell assemblies, extend between the preheating chambers 15 and 16 within the generating chamber 14. The cell assemblies have open ends 42 in the preheating chamber 16, and preferably, when used as fuel cells, have open ends, very porous closed ends or preferably holes 43 in the end caps 44, most clearly shown in FIG. 4 of the Drawings, at the preheating chamber 15.

Figure 3:
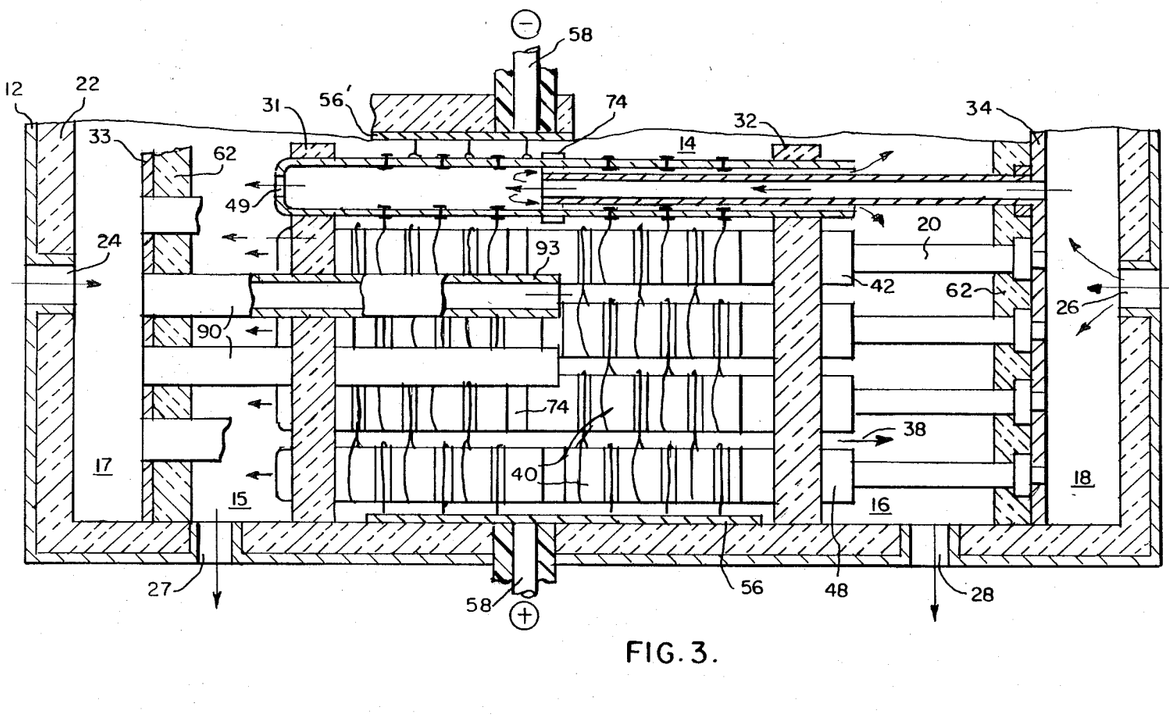
FIG. 3 is a cross-sectional view of one embodiment of the preferred electrochemical generator of this invention showing interior and exterior gas injector tubes and dual combustion product chambers.
Figure 4:
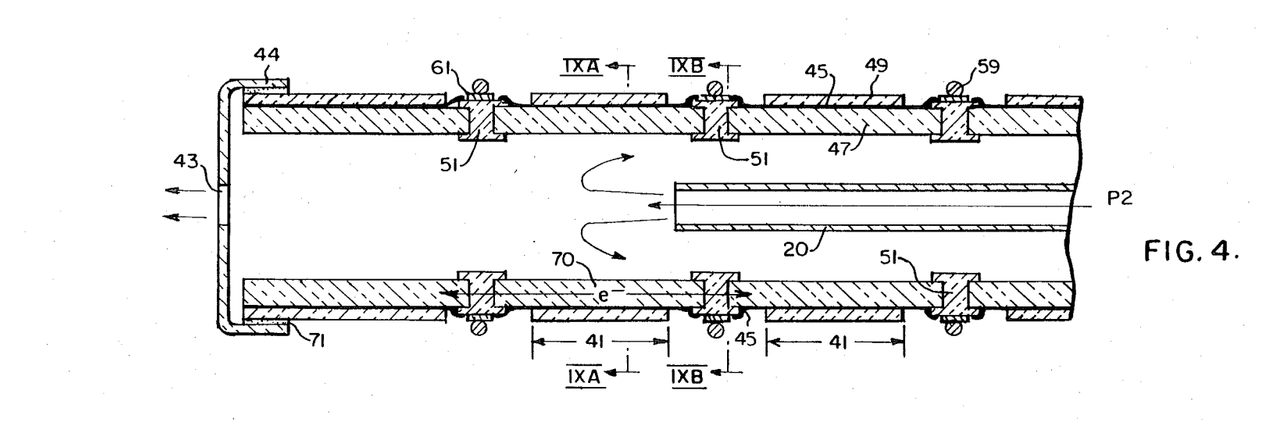
FIG. 4 is a cross-sectional view of several bonded cell elements and interconnection members, making up part of a cell subassembly, along with a gas injector tube and an attached, open end cap, with FIG. 4A and FIG. 4B showing modifications of the interconnection members.

Referring now to FIG. 4 of the Drawings, the fuel cell elements 41 are preferably tubular, and include an electronically insulating, ionically conductive, solid electrolyte 45 sandwiched between two electrodes 47 and 49. The electrodes and electrolyte need not have a separate support structure. Each cell assembly 40 contains an inactive length opening end 48, as shown in FIG. 2 or Fig. 3, and segmented electrochemical lengths corresponding to the fuel cell element length 41. All of the cell element active lengths are contained within the generating chamber 14. Preferably, the air electrode is inner electrode 47 and comprises a wide outside diameter structure, with a relatively thick wall able to support the electrolyte 45 and an outer electrode 49, preferably a fuel electrode. In a preferred embodiment, the cell elements would be 40 mm long with a 45 mm outside diameter. The air electrode wall would be about 3 mm thick with electrolyte and fuel electrode layers about 10 microns to about 150 microns thick. This provides a mechanically sound ratio of tube thickness to outer diameter. A tube thickness greater than about 3 mm may result in considerable diffusion losses during operation. Such dimensions should not, however, be considered limiting in any way.

Figure 4A:
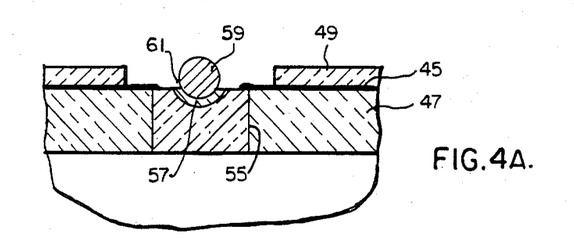
Figure 4B:
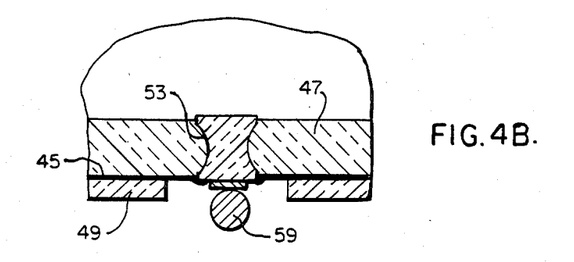

The inner electrode 47 is in electronic connection, i.e., electron flow, with all the other inner electrodes in the cell subassembly. Again referring to the cell element-interconnection member combination shown in FIG. 4 of the Drawings, annular, electronically conducting interconnection ring members 51, generally, but not limited to about 3 mm to about 10 mm wide, are disposed between the cell elements, and contact and are bonded to the inner annular electrodes 47. The interconnection rings are non-porous to fuel and oxidant and chemically stable in those gases, while the inner electrode 47, preferably an air electrode, is porous to oxidant, and the outer electrode 49, preferably a fuel electrode, is porous to fuel. The interconnection ring can have a square channel around its side circumference, to receive the inner electrode, as shown in the two interconnection rings near the end cap 44, or the interconnection ring can have a circular, grooved channel to receive the inner electrode, as shown at point 53 in FIG. 4B. The interconnection ring can also present a simple, ungrooved, flat surface to the annular inner electrode as shown at point 55 in FIG. 4A.

In all cases, each annular inner electrode will be sinter bonded and/or cemented with a compatible, heat resistant, conductive cement to its contacting interconnection ring, to bond the cell subassembly together. This conductive cement can contain air electrode material in a finely divided, i.e., 1 micron to 10 micron, sinter active form. As shown at point 57, any of the interconnection rings described, can have a notched or grooved channel to partly recess wire or other type of electrically conductive assembly connectors 59. Preferably, an optional metal coating 61 will be disposed between the interconnection ring 51 and the assembly connectors 59.

As shown in FIG. 4, non-porous, electronically insulating electrolyte 45 is preferably applied over the outer adjacent surface of the interconnection rings 51 to overlap the outside surface of the interconnection rings. This provides a good gas tight seal, to prevent fuel gas and oxidant gas intermixing. As shown, the outer electrodes 49 are physically and electronically segmented from each other so that there is no direct electronic electron flow path between outer electrode segments on the same cell subassembly nor is there an electronic, electron flow path between the outer electrodes and the inner electrodes. Each successive layer of the cell elements completely surrounds the bottom layer it contacts, with no axially extending radial segmentation. The inner electrode 47, preferably the air electrode, is, however, in direct short-path electronic contact with electronically conductive interconnection rings, so that electrons can directly travel to adjacent inner electrodes on the same subassembly, as shown at point 70 in FIG. 4.

Thus, the elongated electrochemical cell assembly comprises a plurality of long, annular cell subassemblies comprising a plurality of short, annular, self-supporting, cell elements, where each cell element comprises an inner annular electrode, an outer annular electrode, and an annular, solid electrolyte disposed therebetween, with thin, annular, electronically conductive, interconnection members disposed between cell elements and bonded to contacting inner electrodes.

In this assembly, the outer electrodes are electronically segmented from each other on the same subassembly, but the inner electrodes are electronically connected to each other on the same subassembly. The outer electrodes and inner electrodes never physically contact each other in the assembly. The subassembly is, then, a structure with a single interior electronic electron path, with multiple outer electrode and interconnection member electronic contacts, having a single interior gas space. Generally, the air electrodes can be extruded and cut to size, or molded, to provide the desired electrode construction. They are made of a porous material, and are sintered at from about 1350° C. to about 1650° C. The interconnections, likewise, can be extruded or molded to size and configuration. The interconnections are of a dense material, and are sintered at from about 1700° C. to about 1800° C. The air electrodes and interconnections are mated with appropriate cement between them, as described previously, and then are again sintered together at from about 1600° C. to about 1700° C. under a load, to bond the two together. Electrolyte can then be deposited over the whole and sandblasted off the interconnection, or the metal coating can be applied to the interconnection first, in which case the electrolyte will not attach to the nickel coating. The air electrode then can be applied and nickel wires attached for series and parallel connections.

Oxidant injector feed tube 20 is shown in FIG. 4 displaced a distance from the inside end of end cap 44, which is made of a ceramic material, such as stabilized zirconia alumina or magnesia, and is bonded to the end of the cell subassembly by a compatible, heat resistant cement 71 described later, or by sintering techniques. When the self-supporting cell assemblies of this invention are to be used as fuel cells, and when they are to be used in the high gas flow, dual preheater generator design of FIG. 2, instead of the standard generator design of FIG. 1, openings 43 can be drilled in or otherwise provided in the end caps 44. This opening 43 will be sized such that about half of the oxidant gas, P2, entering the feed tube 20 will pass through the opening 43, into preheating chamber 15 beyond the end cap, and approximately half will reverse flow back in the annulus between the air electrode and the feed tube into preheating chamber 16, as also shown in Fig. 3. As mentioned previously, end cap 44 can be so porous as to accomplish the same result.

Figure 5:
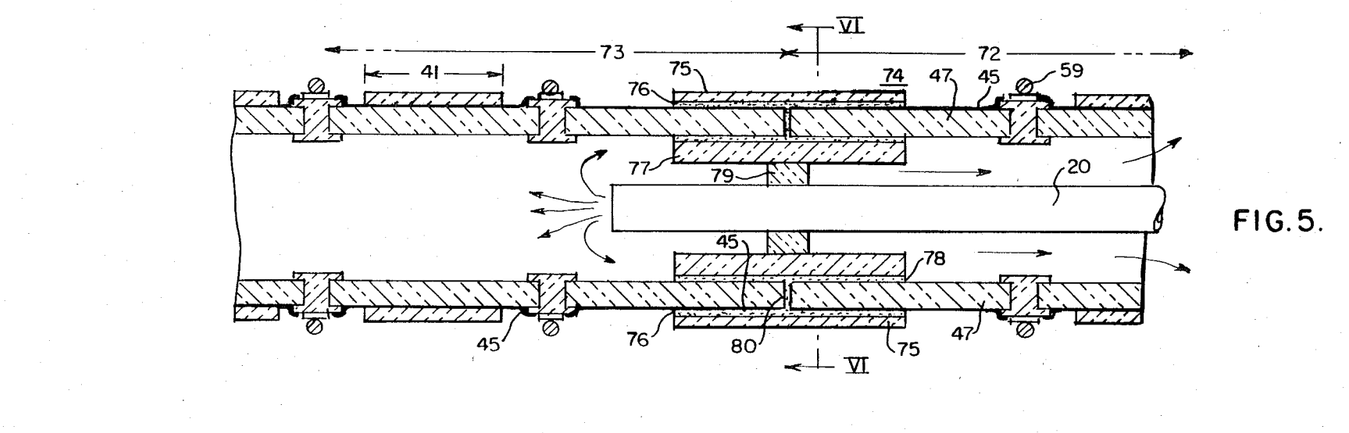
FIG. 5 is a cross-sectional view of the joined ends of two cell segment subassemblies, showing the sleeve member connector which also provides support for an interior gas injector tube.

Referring now to FIG. 5, two subassemblies, 72 and 73, each containing a plurality of cell elements 41, are shown joined by an annular sleeve member 74, used in place of an interconnection member between the subassemblies. The sleeving means can also serve as an inner support for oxidant injector feed tube 20. In the preferred sleeve design shown, the outer sleeve portion 75 is a dense ceramic material, such as dense stabilized zirconia. The outer sleeve is attached to electrolyte 45, covering air electrode 47, by a compatible, heat resistant cement, shown as 76. This cement is similar to the cement 71 which can be used for the end cap, and can contain, for example, a fine and coarse mixture of zirconia particles, the fine particles, about 1 micron to about 10 microns being sinter-active and the coarse particles, about 10 microns to about 100 microns, acting as filler. Thus, air electrode underlying the outer sleeve portion 75 retains a coating of dense solid electrolyte 45, so as to seal the abutting portions of air electrodes 47, but is bare of fuel electrode and is thus inactive. The inner sleeve portion 77 is a porous ceramic material, such as porous stabilized zirconia, also attached with a compatible, heat resistant cement similar to that just described, shown as 78.

Thus, as shown in FIG. 5, dense sleeving material 45 overlies the air electrode joint 80 on the outside and is disposed next to electrolyte, and porous sleeving material 77 overlies the porous air electrode and air electrode joint 80 on the inside. This dense-porous sleeve construction is important, and helps to prevent air electrode degradation at joint 80. The dense electrolyte on the outside of the cell element, along with bonding cement 76 prevents any substantial fuel penetration to joint 80. Oxidant from inside the cell element can flow somewhat through porous inner sleeve 77 and cement 78 to insure that the air electrode at joint 80 is kept in an oxidizing environment, to prevent gradual deterioration and cracking of the air electrode ends near the joint. The joining of the cell subassemblies 72 and 73 does not require absolute gas tightness since the very close fit provides a long, narrow diffusion path for fuel, and hot spots cannot form due to the very low leak rate.

Figure 6:
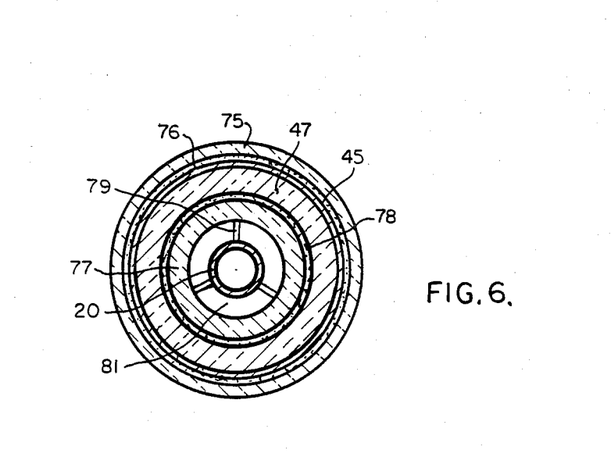
FIG. 6 is a cross-sectional view of the spider support for the interior gas injector tube, shown in FIG. 5, taken along line VI—VI of FIG. 5.

FIG. 6 shows the annular, closed wall construction of the cell elements, and a cross-section of the sleeve design of FIG. 5 along line VI—VI, more clearly pointing out the preferred three member spider support arms means 79, which project from the inside surface of inner sleeve 77, to support oxidant injector tube 20, while still allowing oxidant flow about the injector tube through spaces 81 between the spider support arms. For sake of clarity, the sleeve members 75 and 77 have been shown larger than actual cross-section. The preferred number of spider support arms 79 is three, allowing good support and air flow, and ease of construction. The support extensions need not be the entire length of the sleeve 77 and could be made separately and glued to the inside of sleeve 77. Use of these supports eliminates the possibility of the oxidant injector tubes contacting the inner portions of the cell elements, allowing better and more controllable oxidant flow and lessening breakage possibilities.

Figure 7:
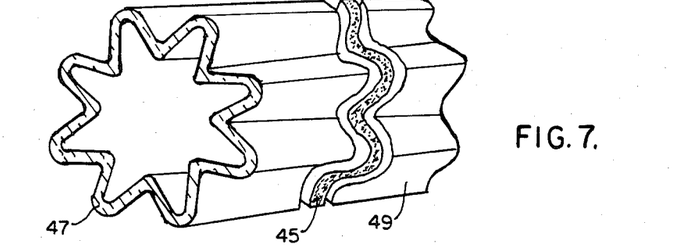
FIG. 7 is a cross-sectional view of one embodiment of a corrugated cross section for a cell element.

Although the cell elements have been shown in their preferred, simple, circular cross-section, this should not be considered limiting. Other configurations, such as the corrugated design shown in FIG. 7 can be used, with air electrode 47, solid electrolyte 45, and fuel electrode 49 shown. Such designs may be of particular interest to gain more active surface, if the volume of the generator must be minimized.

Oxidant, P2, preferably air or oxygen, is fed by some means, such as a manifolding means, into the oxidant injector or feed tubes 20, as shown for example in FIGS. 2 and 3. Fuel, such as hydrogen and carbon monoxide, shown as PI in FIG. 1, is also fed by some means, such as a manifolding means, into fuel injector or feed tubes 90. The fuel injector tubes 90, shown best in FIG. 3, are similar in many respects to the oxidant injector tubes 20. The fuel injector tubes can have an open end design, or a closed end design, where the walls are either very porous ceramic, or small holes are drilled or otherwise formed through the fuel injector tube wall.

In some instances, it might be desirable to have a fuel reforming means integral with the generator, to in-situ reform natural gas, various hydrocarbons, such as methane, or alcohols, and the like, allowing their direct feed, usually along with steam. If it is desired to in-situ reform a raw fuel gas feed, the inside 93 of fuel injector tubes 90 can be lined, coated, or impregnated or otherwise contain a raw fuel reforming catalyst such as, for example, nickel. Heat loss from the in-situ endothermic reforming reaction can be covered by heat exchange through cell subassembly, heat radiation onto the fuel injector tubes near the fuel input end of the generator chamber. As can be seen from FIG. 3, support of the fuel injector tubes 90 can be easily accomplished by tube sheet 33 and porous barrier 31.

Each cell element can generate an open cell voltage as high about as 1 volt, and a plurality can be electrically connected, preferably in a series-parallel, close packed rectangular array. For descriptive purposes, and referring to FIG. 2, the arrangement can be described as including rows 50 and columns 52. Each cell element is electronically connected to the next adjacent cell element, preferably through conductive assembly connectors 59, best shown in FIGS. 3, 8 and 9. Generally, for the preferred configuration shown in FIG. 2, where fuel flows about each cell and an oxidant, such as air, flows within each cell, the anode is the outer periphery of each cell and the cathode is on the inside.

Figure 8:
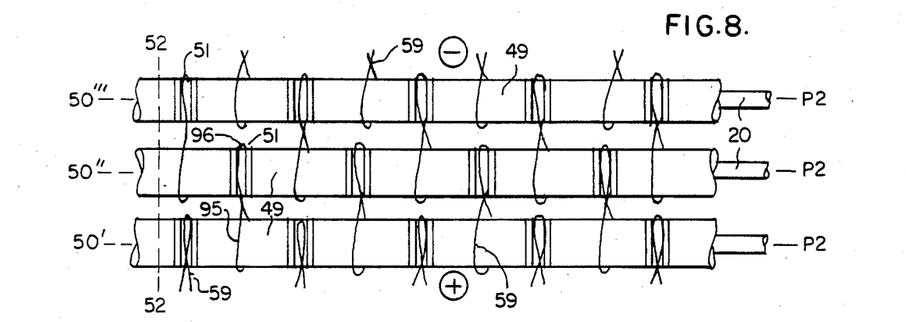
FIG. 8 is a side view of series connection between three adjacent, staggered, electrochemical cell subassemblies.

Specifically referring to FIG. 8, going up the rows in column 52, the fuel electrode anode 49 of row 50' is contacted about its circumference, as at point 95, and is electronically connected only to the interconnection ring member 51 of the staggered cell subassembly in row 50'', as shown, as at point 96, by conductive assembly connector 59, such as the wire shown. This provides series connections between cell elements of adjacent staggered cell subassemblies.

Figure 9A:
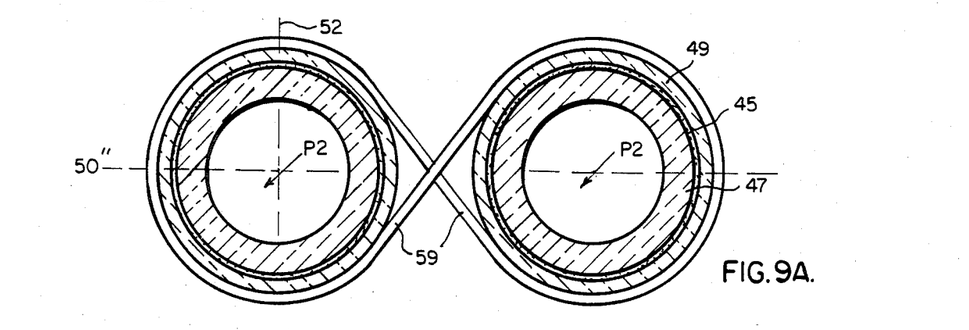
FIG. 9A and FIG. 9B are cross-sectional views of parallel connected, adjacent electrochemical cell subassemblies taken along the lines IXA and IXB of FIG. 4.
Figure 9B:
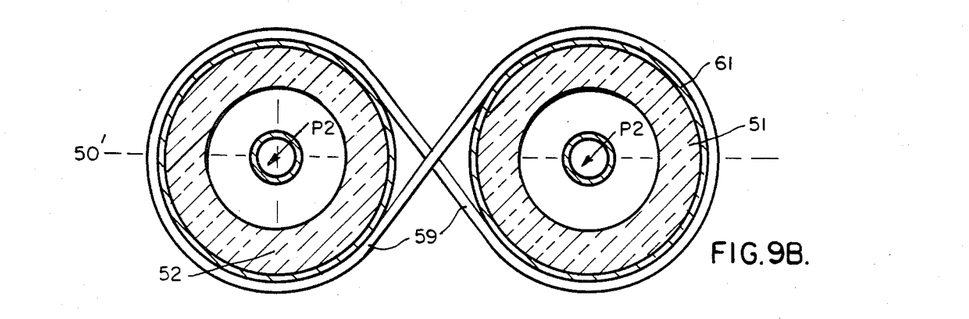

In the parallel connection path, shown in FIG. 9, outer fuel electrodes and interconnections of adjacent cells, along a row 50 are not staggered but are similarly aligned, and are electronically connected, interconnection to interconnection and outer fuel electrode to outer fuel electrode along a row. Thus, specifically referring to FIG. 9A and FIG. 9B, where series connections are now shown for the sake of clarity, and where the cross-section is taken along different assembly lengths, i.e., the cross-section of row 50' is taken along line IXB—IXB of FIG. 4 through the interconnection ring 51, and the cross-section of row 50'' is taken along line IXA—IXA of FIG. 4 through the inner and outer electrode and electrolyte. As can be seen, referring to row 50' of FIG. 9B, in parallel, the conductive assembly connectors 59 contact the interconnection ring members 51 of adjacent subassemblies, optional metal coating 61 of FIG. 4 not being shown. In row 50'' of FIG. 9A, the conductive assembly connectors 59 contact the outer fuel electrode 49 of adjacent subassemblies. Referring now to FIG. 2 of the drawings, the staggered cell assembly can be seen going down column 52''' also shown in FIG. 3, but a non-staggered relationship exists between assemblies along row 50''''.

With the preferred configuration described and shown in FIGS. 2 and 3, cells in the first row 50' generate, for example, approximately 1 volt unloaded, in the second row 50'' voltages add up to approximately 2 volts, in the third row 50''' at approximately 3 volts, and so fourth. Hundreds of cells can be so connected electronically in series to achieve the desired voltage. The direct current electrical energy thus generated is collected by current collectors, preferably conductive metal plates with felt pads. Positive current collector 56, shown in FIG. 3, is positioned in electronic contact with each cell assembly interconnection member in the first row 50', and a second collector, negative current collector 56', is positioned in electronic contact with each cell assembly outer electrode in the last row. Electrical leads 58 are accordingly provided to the current collectors, as best shown in FIG. 3.

The fuel injector tubes 90, and the air injector tubes 20 are preferably loosely supported at one end in the respective tube sheets 33 and 34, as shown best in FIG. 3. The tube sheets 33 and 34 are preferably stainless steel, with flow restricting adaptors that fit about the tubes 20 and 90. The tubes 20 are preferably comprised of alumina, and the tubes sheets are covered with an insulation 62 such as low density alumina. A small leakage of oxidant and fuel, as indicated by arrows 63, is acceptable. The air injector tubes 20 extend from the tube sheet 34 into the open end 42 of the fuel cell assemblies 40, a single tube 20 corresponding to a single fuel cell assembly. The porous barriers 31 and 32, which allow a throughput of depleted fuel and air, are preferably a porous ceramic baffle, such as one comprised of fibrous alumina, felt, or ceramic plate segments with porous inserts such as ceramic wool plugs, surrounding each fuel cell assembly 40. As mentioned previously, barrier 32 may be tighter than barrier 31 to insure adequate depleted fuel flow into the preheating chamber 15.

During operation, an oxidant such as air, P2, enters the inlet chamber 18 through inlet port 26. The chamber 18 can function as an inlet manifold for the individual air injector tubes 20. Air enters the injector tube conduits at a temperature of approximately 500° C. to 700° C., and a pressure above atmospheric, usually being initially heated prior to entering the housing by conventional means such as a heat exchanger coupled with a blower. The air flows within the air injector tubes through the preheating chamber 16, where it is further heated to a temperature of approximately 900° C. The air then flows through the length of the air injector tube, being further heated to approximately 1000° C., and is discharged into the fuel cell assembly 40.

The oxygen from the air within the fuel cell assembly electrochemically reacts at the fuel cell cathode along the active length, depleting somewhat in oxygen content as it approaches the open ends 42 and 43 of the cell assembly. The oxygen-depleted air is then discharged into the combustion product or preheating chambers 15 and 16. A fuel, such as hydrogen or a mixture of carbon monoxide with hydrogen, generally flows from a supply and if necessary, a preheating source into fuel inlet chamber 17 and then into fuel injector tubes 90 to flow into the generating chamber 14. The fuel flows over and about the exterior of the fuel cells, electrochemically reacting at the fuel electrode anode. The depleted fuel, containing approximately five percent to fifteen percent or more of its initial fuel content, diffuses through the barriers 31 and 32 and into the preheating chambers 15 and 16.

The combustion products, including oxygen depleted air and fuel, along with any air or fuel leaking into the preheating chambers 15 and 16 through the tube sheets 33 and 34, directly react exothermically. The heat of this reaction, which completely combusts the fuel, along with the sensible heat of the depleted fuel and air, are utilized to preheat the incoming air and fuel. The combustion products are discharged through combustion product outlet ports 27 and 28 at a temperature of approximately 900° C. or lower. These outlet ports can be located in the combustion product chambers 15 and 16 or the exhaust gases can be manifolded by appropriate means to flow out through the end walls of the generator 30 and 36, parallel to inlet flow. The remaining energy in the exhausted combustion products can be utilized to preheat the incoming air or fuel through, for example, an additional external heat exchanger or to generate steam in conventional generating apparatus.

Materials that can be used for the self-supporting, gas porous, inner air electrode are doped and undoped oxides or mixtures of oxides in the pervoskite family such as $LaMnO_3$, $LaNiO_3$, $LaCoO_3$, $LaCrO_3$, and other electronically conducting mixed oxides generally composed of rare earth oxides mixed with oxides of cobalt, nickel, copper, iron, chromium, and manganese, and combinations of such oxides. The electrolyte is usually a layer of gas-tight, solid oxide material preferably, yttria stabilized zirconia approximately 10 microns to 50 microns thick. The electrolyte can be deposited on the air electrode by well known techniques. The outer fuel electrode must be gas porous, and is preferably a nickel-zirconia cermet or cobalt-zirconia cermet material. It is usually about 10 microns to about 150 microns thick. The interconnection ring member must be electrically conductive in both an oxidant and fuel environment, and is preferably an oxide doped lanthanum chromite. These materials are well known and further described in U.S. Pat. No. 4,490,444. The metal plating on the interconnection ring outer surface can be nickel or cobalt and the preferred conductive assembly connectors are nickel.

As mentioned previously, the electrochemical cell assemblies of this invention, having a closed fuel cell structure and containing a plurality of short, annular, self-supporting, large diameter cell elements, can be used in the prior generator design containing a single generator chamber and a single preheating chamber, and modified, larger oxidant and fuel flow means. This will still provide outstanding cost savings in cell manufacture and generator assembly and through the reduction of the number of cell tubes. The electrochemical cell assemblies of this invention can also be used as electrolysis cells for steam and carbon dioxide, in which case the seal-less generator concept is abandoned and, preferably, cell assemblies of the closed-one-end type are used, i.e., the end cap 44 shown in FIG. 4 is closed. Also the open end inactive part of the electrolysis cell would preferably be extended into the cooler region in order to affect positive seals of the reactants and reaction products.

Generators in accordance with the seal-less arrangements described herein are self-starting, since fuel is essentially combusted to provide hot, oxidant-rich gases for the cathode. Additionally, preheated fuel provides the gas for the anode. Also, lean fuel is directly combusted with oxidant in the combustion product chamber to further preheat the oxidant until a load is applied to the cells, at, for example, an active cell temperature of 700° C. Ohmic heating ($I^2R$) in addition to the heat of the electrochemical reaction (polarization and entropic heat), will bring the generator up to its median operating temperature of between 800° C. and 1100° C. in the active generator area.

Since numerous changes may be made in the above-described arrangements without departing from the spirit and scope thereof, it is intended that all matter contained in the foregoing be interpreted as illustrative, and not in a limiting sense.

I claim:

1. A single electrochemical cell, comprising a plurality of cell segments, the cell segments comprising an annular, electronically conductive, porous, inner electrode; solid electrolyte contacting and surrounding said inner electrode; an electronically conductive, porous outer electrode contacting and surrounding said electrolyte; and an annular; electronically conductive, interconnection member disposed between adjacent segments, electronically connecting the inner electrode of one cell segment to the inner electrode of an adjacent cell segment, the outer electrodes being physically and electronically segmented from each other and from the inner electrodes of adjacent cell segments.

2. An electrochemical cell assembly comprising a plurality of cells of claim 1, joined together by an annular sleeving means where the sleeving means joins cell segments containing only electrolyte portions and inner electrode portions, said sleeving means comprising a dense outer portion disposed next to the electrolyte and a porous inner portion disposed next to the porous inner electrode.

3. The electrochemical cell of claim 1, where the inner electrodes are air electrodes and the outer electrodes are fuel electrodes.

4. The electrochemical cell of claim 1, where the electrolyte components are electronically insulating, gas-impermeable solid oxide material and the interconnection member is an oxide doped lanthanum chromite.

5. The electrochemical cell of claim 4, where the inner electrodes are self-supporting and the outer surface of the annular interconnection members are partly covered with electrolyte.

6. An electrochemical cell assembly configuration comprising a plurality of the cells of claim 1 disposed parallel to each other, where the outside surfaces of the annular interconnection members of each cell are electronically connected to the outer electrode surfaces of an adjacent cell.

7. The electrochemical cell assembly configuration of claim 6, in a housing, where a first gaseous reactant is flowed into the inside of the inner electrodes to contact the inner electrodes, and a second gaseous reactant is flowed about the outside of the outer electrodes to contact the outer electrodes.

8. An axially elongated, annular, fuel cell assembly, comprising a plurality of cell elements, the cell elements comprising a self-supporting, annular, electronically conductive, porous, inner air electrode; solid oxide electrolyte contacting and surrounding said air electrode; and an electronically conductive, porous, outer fuel electrode contacting and surrounding said electrolyte; with an annular, electronically conductive, interconnection members disposed between and bonded to the cell elements, wherein the inner air electrodes of the cell elements on the same cell assembly are electronically connected through the interconnection member, and the outer electrodes of the cell elements on the same cell assembly are physically and electronically segregated from each other and from the inner electrodes on the same cell assembly.

9. A fuel cell assembly comprising two fuel cell assemblies of claim 8, joined together by an annular sleeving means, where the sleeving means joins cell elements containing only electrolyte portions and inner electrode portions, said sleeving means comprising a dense outer gas impermeable portion disposed next to the electrolyte and a porous inner portion disposed next to the porous air electrode.

10. The fuel cell assembly of claim 8, where the outer surface of the annular interconnection members are partly covered with electrolyte.

11. The fuel cell assembly of claim 8, where the air electrode is a material selected from the group consisting of doped and undoped $LaMnO_3$, $LaNiO_3$, $LaCoO_3$, $LaCrO_3$, and mixtures thereof, the fuel electrode is a material selected from the group consisting of nickel zirconia cermet and cobalt zirconia cermet, the electrolyte comprises solid yttria stabilized zirconia, and the interconnection member is an oxide doped lanthanum chromite.

12. A fuel cell assembly configuration comprising a plurality of the cell assemblies of claim 8 disposed parallel to each other, where the outside surfaces of the annular interconnection members of each fuel cell assembly are electronically connected to the outer fuel electrode surfaces of an adjacent cell assembly.

13. The fuel cell assembly configuration of claim 12, in a housing where hot oxidant gas is flowed into the inside of the air electrodes to contact the air electrodes, and hot fuel gas is flowed about the outside of the fuel electrodes to contact the fuel electrodes.

14. A configuration of axially elongated, annular, electrochemical cells comprising one central, axially elongated, electrochemical cell assembly and a plurality of parallel, axially elongated, electrochemical cell assemblies, said electrochemical cell assemblies having a plurality of cell elements, the cell elements comprising an annular, electronically conductive, porous, inner air electrode, an annular, gas-impermeable, solid oxide electronically insulating electrolyte contacting and surrounding said air electrode; and an annular, electronically conductive, porous, outer fuel electrode contacting and surrounding said electrolyte; with an annular, electronically conductive, interconnection member disposed between the cell elements, wherein the inner air electrodes of the cell elements on the same cell assembly are electronically connected through the interconnection member, and the outer electrodes of the cell elements on the same cell assembly are physically and electronically segmented from each other and from the inner electrodes on the same cell assembly, where the outside surfaces of the annular interconnection members of the central elecrochemical cell assembly are connected in series to an adjacent electrochemical cell assembly, such that said outside surfaces of the interconnection members are electronically connected to the outer fuel electrode surfaces of an adjacent electrochemical cell assembly.

15. The configuration of claim 14, where the central electrochemical cell assembly is also connected in parallel to electrochemical cell assemblies, such that the outside surfaces of the interconnection members of the central electrochemical cell assembly are electronically connected to the outside surfaces of the interconnection members of parallel electrochemical assemblies, and the outside fuel electrode surfaces of the central electrochemical cell assembly are electronically connected to the outside fuel electrode surfaces of parallel electrochemical cell assemblies.

16. An electrochemical cell generator comprising:
(A) a housing means defining a plurality of chambers including a generator chamber and a combustion product chamber;
(B) a porous barrier separating said generator and combustion product chambers;
(C) a plurality of axially elongated, electrochemical cell assemblies disposed within said generator chamber, said electrochemical cell assemblies each comprising a plurality of cell elements, the cell elements comprising an annular electronically conductive, porous, inner electrode; solid electrolyte contacting and surrounding said first electrode; and an electronically conductive, porous outer electrode contacting and surrounding said electrolyte; with annular, electronically conductive, interconnection members disposed between the cell elements, wherein the inner electrodes of the cell elements on the same cell assembly are electronically connected through the interconnection member, and the outer electrodes of the cell elements on the same cell assembly are physically and electronically segmented from each other and from the inner electrodes on the same cell assembly, to provide a plurality of segmented electrochemical lengths;
(D) means for flowing a first gaseous reactant through said annular fuel cells and through said porous barrier into said combustion product chamber;
(E) means for flowing a second gaseous reactant into said generator chamber, about said fuel cells, and through said porous barrier into said combustion product chamber;
(F) means for segregating said first and second gaseous reactants from direct contact with one another prior to entry of each into said combustion product chamber; and
(G) means to exhaust the first and second reactants from the combustion product chamber.

17. The electrochemical cell generator of claim 16, where each electrochemical cell assembly comprises at least two parts, each part joined together by an annular sleeving means, where the sleeving means joins cell elements containing only electrolyte portions and inner electrode portions, said sleeving means comprising a dense outer portion disposed next to the electrolyte and a porous inner portion disposed next to the porous inner electrode, where the inner electrode is an air electrode, the outer electrode is a fuel electrode, the electrolyte is a gas impermeable solid oxide material, and the interconnection is an oxide doped lanthanum chromite.

18. The electrochemical cell generator of claim 16, where the inner electrode is self-supporting and the outer surface of the annular interconnection members are partly covered with electrolyte.

19. The electrochemical cell generator of claim 16 where the outside surfaces of the annular interconnection members of each electrochemical cell assembly are connected in series to an adjacent electrochemical cell assembly, such that said outside surfaces of the interconnection members are electronically connected to the outer fuel electrode surfaces of an adjacent electrochemical cell assembly.

20. The electrochemical cell generator of claim 16, where the generator chamber is disposed between two combustion product chambers with a porous barrier separating each combustion product chamber from the generator chamber, where the first gaseous reactant and the second gaseous reactant can flow into both combustion product chambers.

21. The electrochemical cell generator of claim 20, where the first gaseous reactant is fed into electrochemical cell assemblies having each end open to a combustion product chamber.

22. The electrochemical cell generator of claim 21, where each electrochemical cell assembly has a gas injector tube extending into the cell assembly to discharge the first gaseous reactant within the electrochemical cell and has a means for flowing the first gaseous reactant into each gas injector tube, and where a plurality of gas injector tubes are disposed outside of and among the electrochemical cell assemblies in the generator chamber and have a means for flowing the second gaseous reactant into the generator chamber, where the openings in the electrochemical cell assemblies and the porosities of the porous barriers separating each combustion product chamber from the generator chamber allow approximately equal flow of both gaseous reactants into both combustion product chambers.

23. An electrochemical cell generator comprising:
(A) a housing means defining a plurality of chambers including two combustion product chambers with a generator chamber disposed between them;
(B) porous barriers separating said generator chamber from the two combustion product chambers;
(C) a plurality of axially elongated, annular, electrochemical cells disposed within said generator chamber;
(D) means for flowing a first gaseous reactant through said annular electrochemical cells and through said porous barriers into both of said combustion product chambers;
(E) means for flowing a second gaseous reactant into said generator chamber, about said electrochemical cells, and through said porous barriers into both of said combustion product chambers;
(F) means for segregating said first and second gaseous reactants from direct contact with one another prior to entry of each into said combustion product chambers; and
(G) means to exhaust the first and second reactants from the combustion product chambers.

24. The electrocemical cell generator of claim 23, where the electrochemical cells each comprise a plurality of cell elements, the cell elements comprising an annular, electronically conductive, porous, inner electrode; solid electrolyte contacting and surrounding said first electrode; and an electronically conductive, porous, outer electrode contacting and surrounding said electrolyte; with annular, electronically conductive, interconnection members disposed between cell elements, wherein the inner electrodes of the cell elements on the same cell assembly are electronically connected through the interconnection member, and the outer electrodes of the cell elements on the same cell assembly are physically and electronically segmented from each other and from the inner electrodes on the same cell assembly, to provide a plurality of segmented electrochemical lengths.

25. The electrochemical cell generator of claim 24, where each electrochemical cell assembly comprises at least two parts, each part joined together by an annular sleeving means, where the sleeving means joins cell elements containing only electrolyte portions and inner electrode portions, said sleeving means comprising a dense outer portion disposed next to the electrolyte and a porous inner portion disposed next to the porous inner electrode, where the inner electrode is an air electrode, the outer electrode is a fuel electrode, the electrolyte is a gas impermeable solid oxide material and the interconnection is an oxide doped lanthanum chromite.

26. The electrochemical cell generator of claim 24, where the inner electrode is self-supporting and the outer surface of the annular interconnection members are partly covered with electrolyte.

27. The electrochemical cell generator of claim 24, where the first gaseous reactant is fed into electrochemical cell assemblies having each end open to a combustion product chamber.

28. The electrochemical cell generator of claim 27, where each electrochemical cell assembly has a gas injector tube extending into the cell assembly to discharge the first gaseous reactant within the electrochemical cell and has a means for flowing the first gaseous reactant into each gas injector tube, and where a plurality of gas injector tubes are disposed outside of and among the electrochemical cell assemblies in the generator chamber and have a means for flowing the second gaseous reactant into the generator chamber, where the openings in the electrochemical cell assemblies and the porosities of the porous barriers separating each combustion product chamber from the generator chamber allow approximately equal flow of both gaseous reactants into both combustion product chambers.

29. A solid electrolyte fuel cell generator comprising:
(A) a housing means defining a plurality of chambers including a generator chamber and two combustion product chambers with a generator chamber disposed between them;
(B) porous barriers separating said generator chamber from the two combustion product chambers;
(C) a plurality of axially elongated, annular, electrochemical cell assemblies disposed within said generator chamber, said electrochemical cell assemblies each comprising a plurality of cell elements, the cell elements comprising an annular, electronically conductive, porous, inner electrode; solid electrolyte contacting and surrounding said first electrode; and an electronically conductive, porous outer electrode contacting and completely surrounding said electrolyte; with annular, electronically conductive, interconnection members disposed between the cell elements, electronically connecting the inner electrodes of the cell elements to the inner electrode of adjacent cell elements on the same cell assembly, and the outer electrodes of the cell elements are physically and electronically segmented from the outer electrodes of adjacent cell elements on the same cell assembly and from the inner electrodes of adjacent cell elements on the same cell assembly, to provide a plurality of segmented electrochemical lengths;
(D) means for flowing a first gaseous reactant through said annular fuel cells and through said porous barriers into both of said combustion product chambers;
(E) means for flowing a second gaseous reactant into said generator chamber, about said fuel cells, and through said porous barriers into both of said combustion product chambers;

(F) means for segregating said first and second gaseous reactants from direct contact with one another prior to entry of each into said combustion product chambers; and (G) means to exhaust the first and second reactants from the combustion product chambers.

30. The fuel cell generator of claim 29, where each electrochemical cell assembly comprises at least two parts, each part joined together by an annular sleeving means, where the sleeving means joins cell elements containing only electrolyte portions and inner electrode portions, said sleeving means comprising a dense outer portion disposed next to the electrolyte and a porous inner portion disposed next to the porous inner electrode, where the inner electrode is an air electrode, the outer electrode is a fuel electrode, the electrolyte is a gas impermeable solid oxide material and the interconnection is an oxide doped lanthanum chromite.

31. The fuel cell generator of claim 29, where the inner electrode is self-supporting and the outer surface of the annular interconnection members are partly covered with electrolyte.

32. The fuel cell generator of claim 29 where the first gaseous reactant is fed into electrochemical cell assemblies having each end open to a combustion product chamber.

33. The fuel cell generator of claim 29 where the outside surfaces of the annular interconnection members of each electrochemical cell assembly are connected in series to an adjacent electrochemical cell assembly, such that said outside surfaces of the interconnection members are electronically connected to the outer fuel electrode surfaces of an adjacent electrochemical cell assembly.

34. The fuel cell generator of claim 33 where each electrochemical cell assembly is also connected in parallel to adjacent electrochemical cell assemblies, such that the outside surfaces of the annular interconnection members of the electrochemical cell assemblies are electronically connected to the outside surfaces of the annular interconnection members of adjacent electrochemical assemblies, and the outside fuel electrode surfaces of the electrochemical cell assemblies are electronically connected to the outside fuel electrode surfaces of adjacent electrochemical cell assemblies.

35. The fuel cell generator of claim 32, where each electrochemical cell assembly has a gas injector tube extending into the cell assembly to discharge the first gaseous reactant within the electrochemical cell and has a means for flowing the first gaseous reactant into each gas injector tube, and where a plurality of gas injector tubes are disposed outside of and among the electrochemical cell assemblies in the generator chamber and have a means for flowing the second gaseous reactant into the generator chamber, where the openings in the electrochemical cell assemblies and the porosities of the porous barriers separating each combustion product chamber from the generator chamber allow approximatey equal flow of both gaseous reactants into both combustion product chambers.

36. The fuel cell generator of claim 35, where the inner electrode is an air electrode, the outer electrode is a fuel electrode, the first gaseous reactant is an oxidant, and the second gaseous reactant is a fuel, and where the gas injector tubes disposed outside of the electrochemical cell assemblies have an inner coating of a fuel reforming catalyst.

37. The fuel cell generator of claim 35, where the gas injector tube extending into the cell assembly is supported within the assembly by the inner portion of the sleeving means.

* * * * *